June 22, 1943.

J. S. STULL 2,322,551

ARTICLE HANDLING APPARATUS

Filed Feb. 28, 1942

INVENTOR
J. S. STULL
BY Harry L. Duft
ATTORNEY

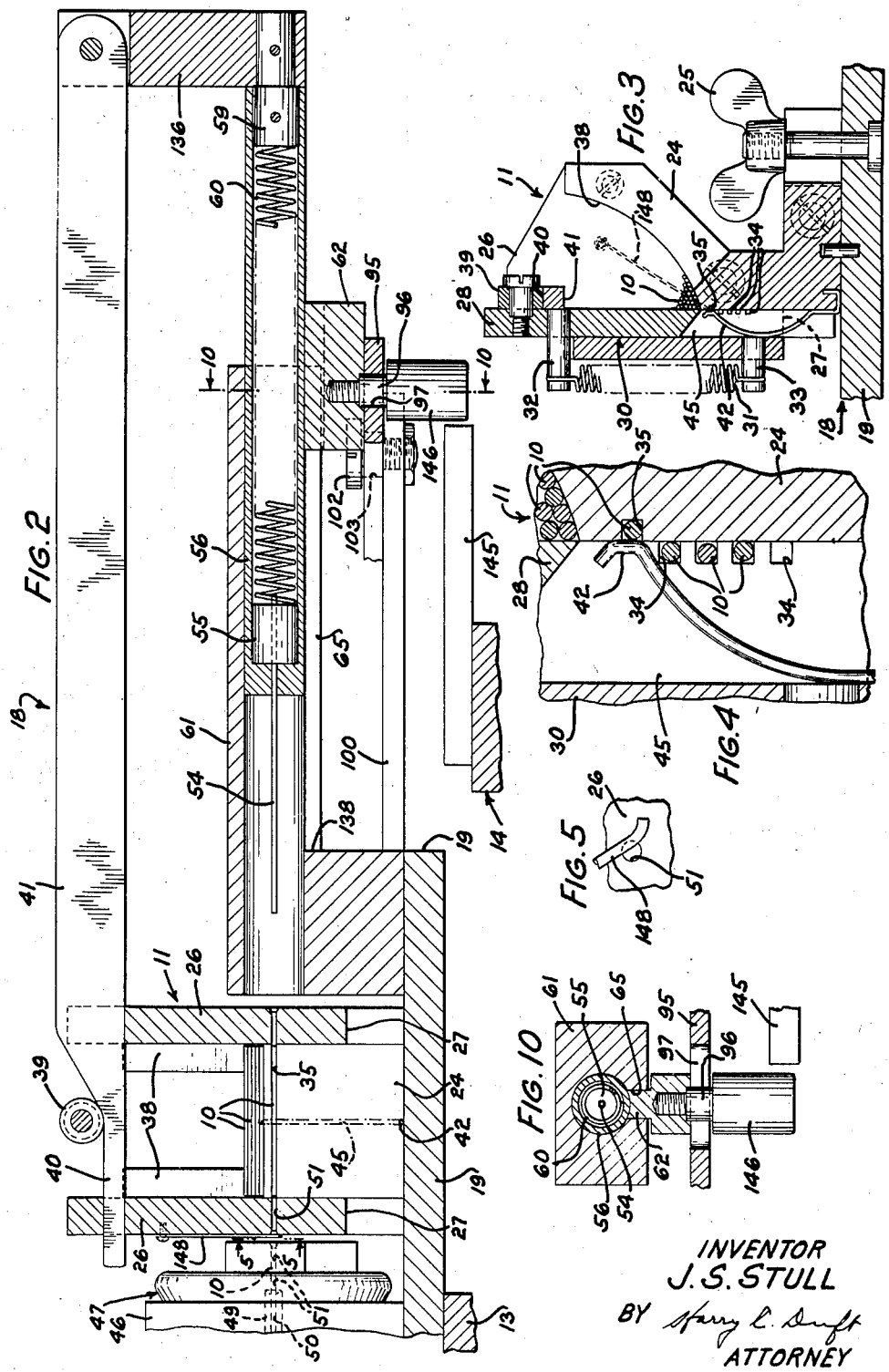

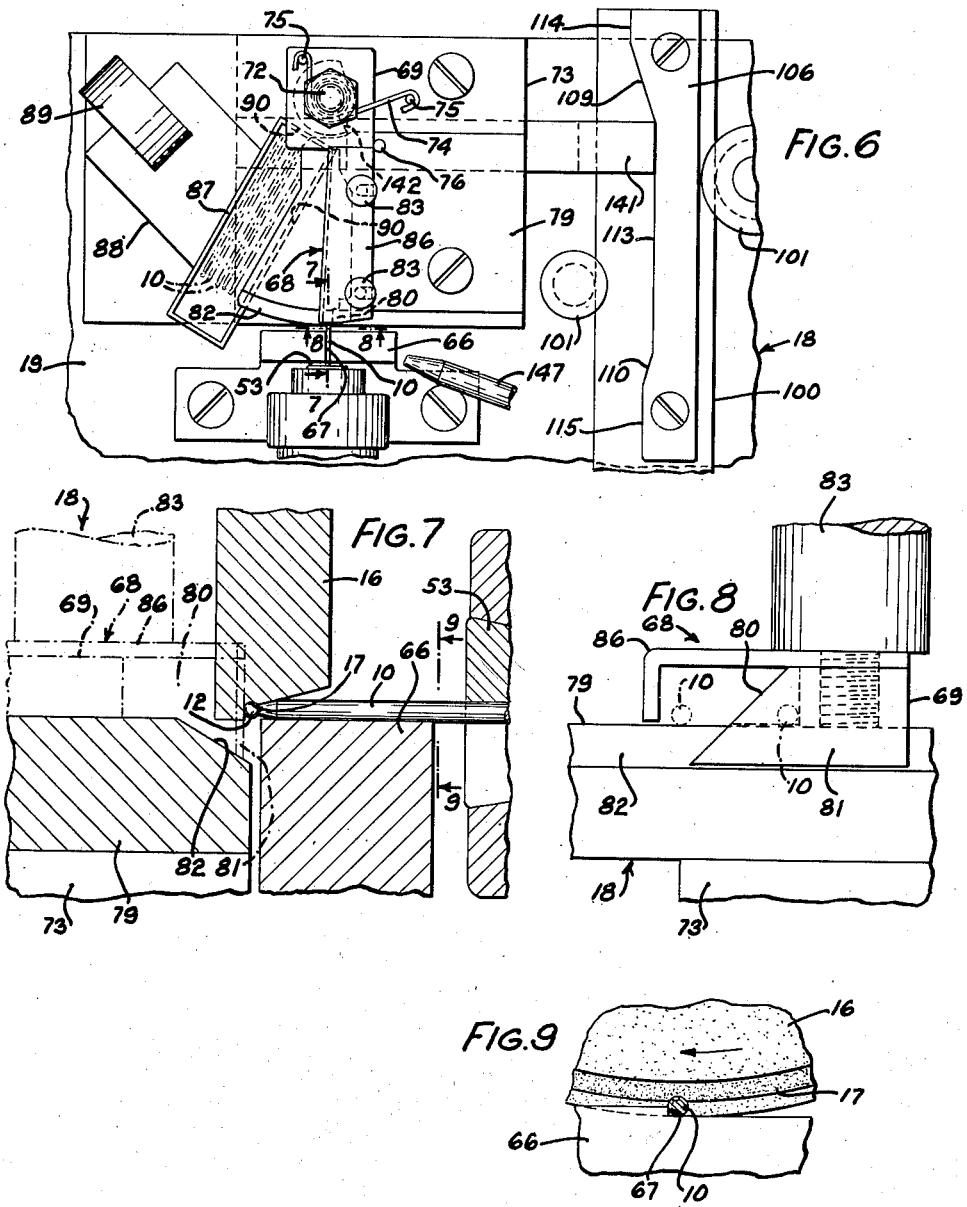

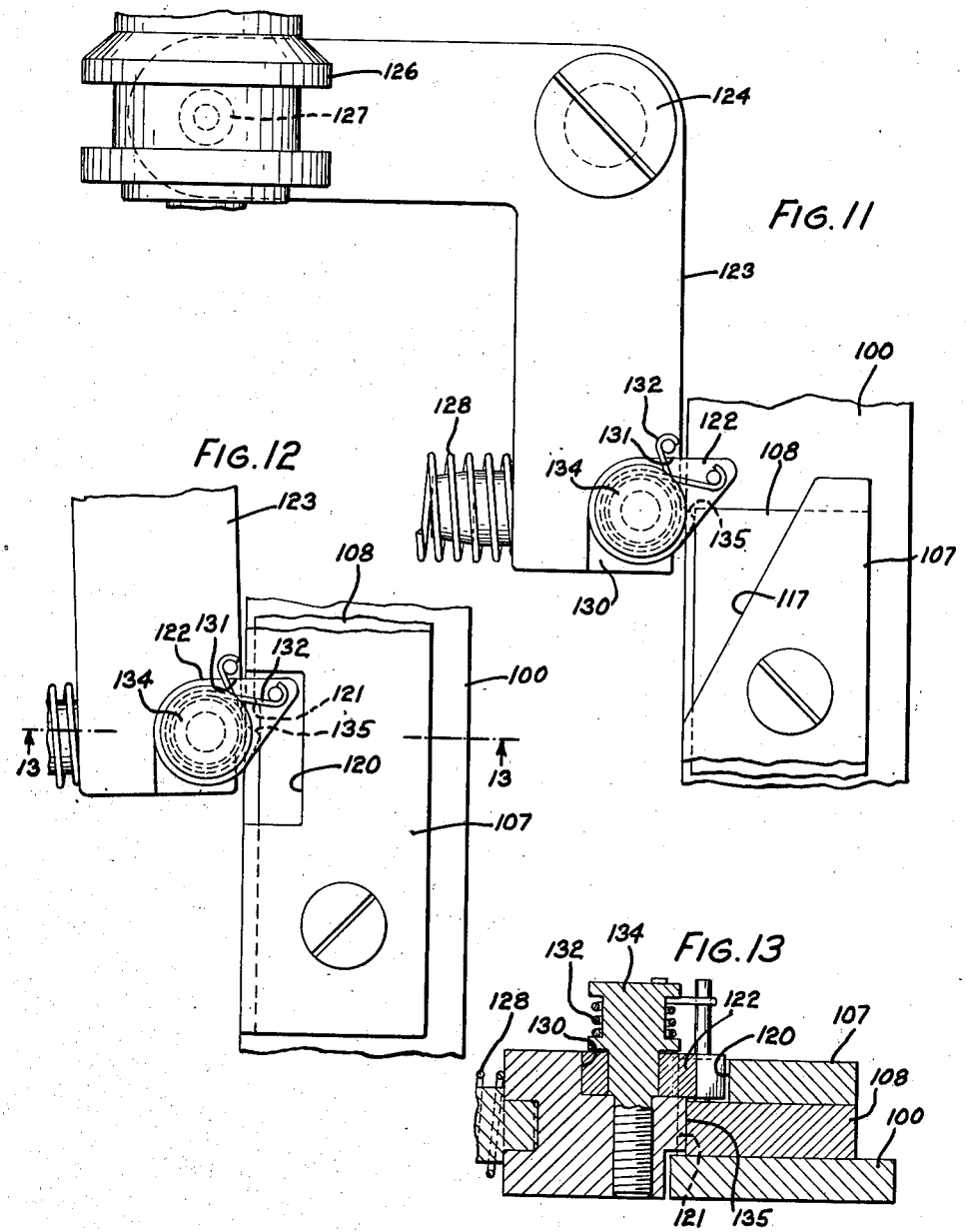

Patented June 22, 1943

2,322,551

UNITED STATES PATENT OFFICE 2,322,551

ARTICLE HANDLING APPARATUS

John S. Stull, Chicago, Ill., assignor to Western Electric Company, Incorporated, New York, N. Y., a corporation of New York Application February 28, 1942, Serial No. 432,875

6 Claims. (Cl. 51—105)

This invention relates to article handling apparatus and more particularly to an apparatus for intermittently feeding article blanks to a working position and thereafter transferring the worked articles therefrom.

An object of this invention is to provide an apparatus for rapidly and accurately intermittently feeding article blanks to a working position and thereafter transferring the worked articles therefrom.

In accordance with the general features of this invention, there is provided in one embodiment thereof a fixture for use on a machine for grinding peripheral contours on the leading ends of a train of piano-wire blanks, to be used as burnishing tools for cleaning switch contacts in telephone systems. Specifically, the fixture, which is attached to a horizontally movable table of the machine, comprises a hand-actuated lever controlled device for intermittently feeding tool blanks from a magazine along the longitudinal axis of a continuously driven air motor to an open chuck carried by the motor rotor. The forward movement of the blanks, after the ejection of a finished blank, is limited by the following blank engaging a stop surface provided on means for transferring the finished tool to a container. The blank is ground by a grinding wheel to the desired shape on the end of the blank when the table carrying the fixture is moved laterally under the wheel. After a blank has been ground, a hand lever is operated through a cycle and in timed relation through operatively connected cam actuated means, the chuck is opened to release the tool and the transfer means moves into operative position to transfer the tool, which is then ejected by the following blank which engages the stop surface. Thereafter, the chuck is closed to grip the following blank and the transfer means is moved to carry and deposit the previously ground tool in a container and finally the table is moved to carry the chucked blank under the grinding wheel.

Other objects and advantages of this invention will more fully appear from the following detailed description, taken in conjunction with the accompanying drawings, in which Fig. 1 is a fragmentary plan view of a grinding apparatus having a fixture embodying the features of this invention attached thereto;

Figs. 2 and 3 are enlarged fragmentary vertical sections taken on the lines 2—2 and 3—3, respectively, of Fig. 1;

Fig. 4 is an enlarged fragmentary view of Fig. 3;

Fig. 5 is an enlarged fragmentary detail view taken on the line 5—5 of Fig. 2;

Fig. 6 is an enlarged fragmentary plan view of Fig. 1 showing the tool transfer means in position for receiving a finished tool;

Fig. 7 is a greatly enlarged fragmentary vertical section taken on the line 7—7 of Fig. 6, showing the tool blank on the anvil and the grinding wheel in position for operating thereon;

Fig. 8 is a greatly enlarged fragmentary vertical view taken on the line 8—8 of Fig. 6;

Fig. 9 is a fragmentary vertical section taken on the line 9—9 of Fig. 7.

Fig. 10 is a fragmentary vertical section taken on the line 10—10 of Fig. 2;

Fig. 11 is an enlarged fragmentary detail view of Fig. 1, showing the chuck actuating mechanism in a normal position;

Fig. 12 is a similar fragmentary view of another position of the mechanism of Fig. 11, and Fig. 13 is a vertical section taken on the line 13—13 of Fig. 12.

Figure 1:
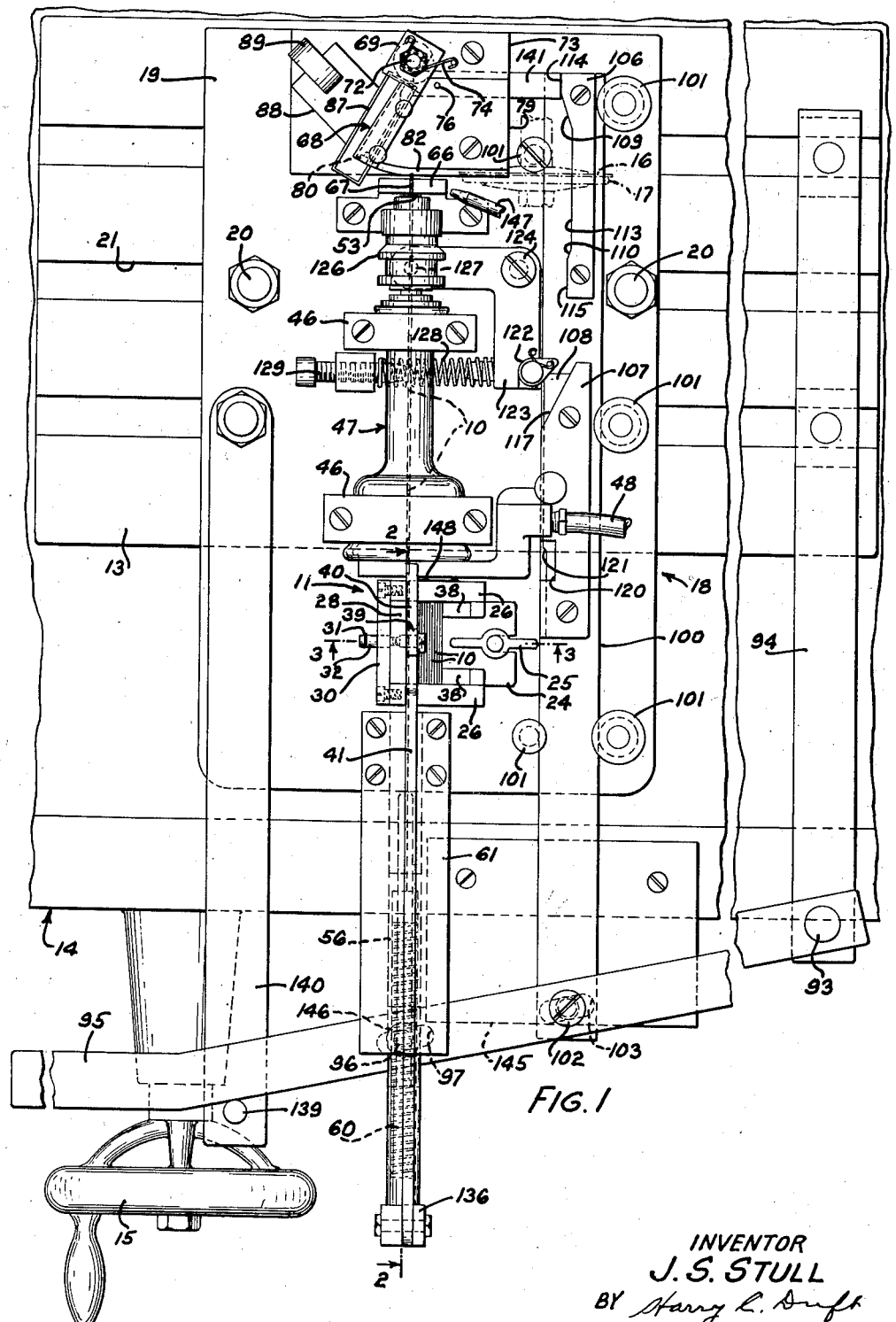

One embodiment of the fixture of this invention is shown in the drawings applied to the intermittent feeding of piano-wire blanks 10 in train formation (Figs. 1, 2, 3 and 7) from a supply magazine 11 to accurately present the leading ends of successive blanks at a predetermined position, following which (Fig. 7) they are peripherally ground to form a tapered and ball-shaped end on the blank, as indicated at 12. The blanks 10 are of small dimensions, being approximately of .025" diameter and one and one-quarter inches in length.

Referring to the drawings, particularly to Fig. 1, 13 represents a reciprocatory work holding table of a surface grinder of a well-known commercial type, indicated in general at 14. By means of suitable operating connections (not shown) between a hand wheel 15 and the table 13, the latter is reciprocated to carry the blank to be ground to and fro under a continuously driven grinding wheel 16 (Figs. 1, 7 and 9). Since the grinding machine, which includes the table 13, hand wheel 15 and grinding wheel 16, heretofore briefly described, are well known in the art of grinding, a more complete description thereof is not believed necessary to a full understanding of the present invention, except for the grinding wheel, which is formed with a suitable peripheral contour, indicated at 17 (Figs. 7 and 9), effective to grind the end 12 on the blanks 10.

The fixture, indicated, in general, at 18 (Fig. 1), comprises a base plate 19, which is secured to the reciprocatory table 13 by bolts 20 extending at their upper ends through apertures in the plate and at their lower ends into a T-shaped slot 21 of the table. Carried upon the base plate 19 is the magazine 11 (Figs. 1, 2 and 3), in which is stored a supply of wire blanks 10. The magazine 11 includes a base member 24 secured to the plate 19 by a thumb screw 25 and attached at opposite sides to the base member are side plates 26. Vertically slidable at one side face on the base 24 and at opposite vertical edges on projecting portions 27 of the side plates 26 is a blank transferring and aligning plate 28, the opposite side of the plate being slidable on a cover plate 30, which is secured to the projecting portions of the side plates 26. A tension spring 31, having opposite ends attached to pins 32 and 33 fixed to the slidable blank transferring and cover plates 28 and 30, respectively, serves to normally maintain the plate 28 in its lowermost position (Fig. 3). The opposed vertical faces of the blank transferring plate 28 and the base member 24 are slotted in a horizontal direction, as indicated at 34 and 35, respectively (Figs. 3 and 4), the plate 28 being provided with a plurality of slots 34 and the stationary member 24 with a single slot.

As clearly shown in Figs. 2 and 3, the supply of blanks 10 in the magazine 11 is supported mainly upon arcuate shaped spaced surfaces 38 of the base member 24 and the inner face of the slidable plate 28, the length of the blanks 10 being slightly less than the distance between the opposed inner faces of the side plates 26. In the normal lowered position of the slidable plate 28, as limited by a roller 39 carried thereon, engaging a surface 40 of a slidable cam plate 41, the upper slot 34 of the plate 28 lies slightly below the slot 35 (Fig. 4) of the base member 24.

In the operation of the fixture 18 the slidable blank transferring plate 28 is moved upwardly and downwardly by the slidable cam plate 41 and for each complete reciprocation of the plate 28 a blank 10 is entered in the slot 35 from one or the other of the slots 34. When the slots 34 are moved above the slot 35 and into the supply of blanks 10, blanks will move into any of the slots 35 which are empty and when the slots 34 move downwardly, the blanks engage a wire leaf spring 42 fixed at its lower end to the base member 24. The spring 42 (Figs. 3 and 4) is entered in a vertical slot 45 in the slidable blank transferring plate 28 with its upper end lying in the path of the blanks 10 carried in the slots 34 and is adapted to bear thereagainst and move the first blank 10, aligned with the slot 35 and carried in a slot 34, as it passes the slot 35 into the latter slot. This may occur either in the upward or downward movement of the plate 28. This insures that a blank 10 will at all times be carried in the stationary slot 35 ready to be fed forward.

Attached by supports 46 to the base plate 19 at the upper side of the magazine 11, as viewed in Fig. 1, is an air driven motor 47 of a commercial turbine type, which is supplied with compressed air from a suitable supply (not shown) through a pipe 48. Along the axis of the rotor of the motor 47 and carried thereby is a bushing 49 (Fig. 2) having its bore 50 axially aligned with the blank 10 carried in the magazine slot 35, the blanks being fed from the magazine 11 through alined apertures 51 in the side plate 26 and stationary parts of the motor 47 and to the bore 50 of the bushing. Fixed to the upper end (Fig. 1) of the rotor of the motor 47 is a split spring collet or chuck 53, which is operated to grasp and release a blank 10 fed thereinto from the bushing 49, in a manner to be presently described, the chuck being momentarily stalled during the opening and closing thereof. The details of the chuck 53 are not shown since they are not believed necessary to an understanding of the present invention.

The blanks 10 are fed one by one from the magazine slot 35 and apertures 51 into abutting train formation through the axis of the motor and to the chuck 53 by a plunger 54 (Fig. 2) having a diameter similar to that of the blanks and movable through the magazine slot 35, which is stationary. The plunger 54 is attached to a piston-like member 55, slidable in a cylinder 56 closed at one end by shouldered plug 59. A compression spring 60, carried in the cylinder 56 with its opposite ends abutting the opposed inner end faces of the piston 55 and the plug 59 serves to normally maintain the piston carrying the plunger 54 abutting an apertured end wall of the cylinder 56, the plunger extending through and being slidable in the apertured cylinder end wall. The cylinder 56 is longitudinally slidable in a stationary bearing member 61 fixed to the base plate 19. Attached to the bottom wall of the cylinder 56 is a cylinder actuator block 62, which extends through a slot 65 (Fig. 10) in the member 61. The means for actuating the block 62 will be described hereinafter. In the operation of the apparatus, the block 62, which is shown in its normal position (Fig. 2), is moved to the left and the cylinder 56 and plug 59 move therewith and through the compression spring 60 the piston 55 and plunger 54 are likewise advanced, the plunger yielding when the leading blank reaches a predetermined position.

Above the outer end of the chuck 53, as viewed in Fig. 1, and also shown in Figs. 6, 7, and 9, is a stationary anvil 66, which is secured to the base plate 19. The anvil 66 is formed with an upper shouldered face (Fig. 9) which provides a vertical thrust face 67 against which rests the outer end of the blank 10 during the grinding thereof by the wheel 16, which rotates in a clockwise direction (Fig. 9) to prevent deflection of the blank.

The tool receiving and transfer means, indicated in general at 68 (Figs. 1 and 6) comprises a pivotal member 69 having an integral vertical post 72 journalled in an irregularly shaped base 73 fixed to the base plate 19. A torsion spring 74, coiled around the post 72, with its opposite ends anchored to pins 75 secured to the member 69, and the base 73 serve to constantly urge the member 69 in a counterclockwise direction to the position shown in Fig. 6, where the member abuts a stop pin 76 carried in a plate 79 secured to the upper face of the base 73, the ground tool being ejected onto the plate 79. The pivotal member 69, in its movement, slides upon the upper face of the plate 79 and, at its free end adjacent the anvil 66, is formed at its left side with an extending portion having a downwardly inclined face 80, which, at its junction with an extreme end face 81 of the member 69, is disposed below the upper face of the plate 79 (Figs. 7 and 8) and the latter face is beveled, as indicated at 82, to permit the end face 81 to extend below the upper face of the plate. The end face 81 which is vertical and relieved at its right hand end (Figs. 6 and 8) serves as a stop face for the leading blank 10 to be ground during the feeding of the blanks from the magazine 11 by the plunger 54. Attached to the upper face of the pivotal member 69 by thumb screws 83 is an angle plate 86 having its vertical short arm suitably laterally spaced from the inclined face 80 of the member 69 and its lower edge slightly spaced from the upper face of the plate 79. Thus, in the position of the pivotal member 69 (Fig. 8) a finished tool blank 10, as it is fed out of the chuck 53, will be delivered onto the upper face of the plate 79, guided by the beveled face 82 thereof and between the inner face of the vertical short arm of the angle plate 86 and the inclined face 80 of the member 69.

A container, indicated at 87 (Figs. 1 and 6) is provided for receiving the ground tools 10 as the transfer means 68 is moved to its normal position, as shown in Fig. 1. The container 87 is attached to a block 88, which is provided with a handle 89 and in placing the container in position for receiving a quantity of ground tools 10, the block is merely slid upon the base 73 until the leading end and side walls abut angularly arranged vertical faces 90 of the base 73. In this position of the container 87, it will lie below the plate 79 and its side wall, which is abutting the face 99 of the base 73, as clearly shown in Fig. 6, will be to the right of the left edge of the plate 79. Thus, as the ground tool 10 is swept over the plate 79 by the inclined advancing face 80 of the transfer means 68, it will drop from the plate 79 into the container 87.

The means for opening the chuck 53 to release a ground tool 10, moving the tool transfer means 68 to the position shown in Fig. 6 for receiving the ejected tool from the chuck and feeding a tool blank 10 into the open chuck from the train of blanks being fed from the magazine 11, which is effected simultaneously with the ejection of the ground tool therefrom, moving the transfer means to position the stop face 80 thereof in the path of the tool blank, closing the chuck and moving the transfer means to deposit the ground tool in the container, all in timed relation to complete a cycle operation of the fixture 18, will now be described.

Pivoted at 93 (Fig. 1) to a bar 94 fixed to the reciprocatory table 13 is a hand lever 95, which is pivotally connected (Figs. 1, 2 and 10) to the actuator block 62 for the blank feeding cylinder 56 by a shouldered screw 96 extending through a slot 97 in the lever and threaded into the block. Mounted for reciprocatory movement upon the upper face of the fixture base plate 19 is a cam carrying bar 100, which is rectilinearly guided upon the table by a plurality of flanged rollers 101 engaging opposite longitudinal edges of the bar. The bar 100 is pivotally connected to the hand lever 95 by a shouldered screw 102 extending through a slot 103 in the lever and bolted to the bar (Figs. 1 and 2). Secured to the upper face of the bar 100 are two cam plates 106 and 107 for actuating the ground tool transfer means 68 and the clutch 53, respectively. A third cam plate 108 is arranged below the cam plate 107 and cooperates therewith in actuating the clutch 53. The cam plate 106 is formed with two spaced reversely directed cam faces 109 and 110, an intermediate dwell face 113 and opposite end dwell faces 114 and 115.

The cam plate 107 is provided with a cam face 117 at its upper end and a notch 120 a suitable distance therebelow, in its left hand edge, as viewed in Figs. 1 and 12. The cam plate 108, arranged below the cam plate 107, has its left hand edge disposed slightly within the similar edges of the cam plate 107 and bar 100, which latter edges are in vertical alignment. Formed in the left hand edge of the cam plate 108, between opposite ends of the notch 120 of the cam plate 107 is a cam face 121. Lying in the path of the cam face 117 in the normal lowered position of the cam bar 100 (Figs. 1 and 11) is a spring pressed dog 122 pivotally carried upon the vertical arm of a bell crank lever 123 pivoted at 124 to the fixture base plate 19. The horizontal arm of the lever 123 extends under a flanged actuator sleeve 126 for the chuck 53, the lever arm carrying a roller 127 arranged to engage opposite annular inner faces of the flanges on the chuck actuator sleeve 126 at predetermined intervals in an operating cycle of the fixture. In the normal position of the mechanism, as shown in Figs. 1 and 11, it will be assumed that a blank 10 has just been ground and following which the fixture 18 was moved from under the wheel 16 and the ground tool 10 is still gripped by the rotating chuck 53. Thus, in the position shown, the chuck 53 is closed and a compression spring 128, having its opposite ends engaging the vertical arm of the lever 123 and a stationary adjustable screw 129, serves to normally rock the lever 123 in a counterclockwise direction to maintain the roller 127 intermediate the flanges of the chuck actuator sleeve 126 (Fig. 11). The movement of the lever 123 counterclockwise at this period is limited by stop means to be presently referred to. When the lever 123 is rocked clockwise, which occurs when the cam face 117, moving upwards, as viewed in Figs. 1 and 11, engages the dog 122, the roller 127 will move upward and press against the upper flange of the chuck actuator sleeve 126 and open the chuck.

The pivotal dog 122 is carried in a depression 130 in the lever 123 and in its normal position (Figs. 1 and 11) is held abutting a stop face 131 on the lever by a torsion spring 132 coiled about a pin 134, which pivotally supports the dog upon the lever, the spring having its opposite ends anchored to pins carried in the dog and lever. On the right hand face of the vertical arm of the lever 123, below the dog 122, is a cam projection 135, which bears on the left hand edge of the cam plate 108, due to the action of the spring 128, thus providing a stop means for the lever 123 in the normal position of the fixture (Figs. 1 and 11). It will be observed that whenever the cam projection 135 bears upon the left hand edge of the plate 108 the roller 127 will be held intermediate the flanges of the chuck actuator sleeve 126 and thus no pressure, either upwardly to open the chuck or downwardly to close the chuck, is being exerted on the sleeve, in which case the chuck 53 is free to rotate. This position of the roller 127 continues while the fixture is in its normal position, withdrawn from the grinding wheel 16, as well as during the grinding operation.

During each upward and downward movement of the hand lever 95, as viewed in Fig. 1, the cam plate 41 associated with the magazine 11 is given a complete reciprocation and through the roller 39 the blank transfer plate 29 of the magazine 11 is raised and lowered in order to, in the manner previously described, keep the slots 34 filled with blanks 10 so that a blank will always lie in the slot 35 for transfer therefrom by the plunger 54. The reciprocatory movements of the cam plate 41 are effected by a connecting member 136 pinned at one end to the shouldered cylinder plug 59 and at its opposite end to the cam plate.

In a clockwise or upward movement of the hand lever 95, as viewed in Fig. 1, the blank feeding plunger 54, as well as the cam supporting bar 100, will move upwardly (Fig. 1) or, as viewed in Fig. 2, to the left when the hand lever is likewise moved. The extent of this movement of the hand lever 95 is limited by the actuator block 62 engaging an end wall 138 (Fig. 2) of the slot 65 in the bearing member 61. When the hand lever 95 is moved counterclockwise to the position shown in Fig. 1, its movement is limited by a stop pin 139 carried on a bar 140 fixed to the fixture base plate 19.

In the normal lowered position of the cam bar 100 the blank transfer means 69 is held in the position shown (Fig. 1), wherein it had previously transferred and deposited a finished blank 100 in the receptacle 87, against the action of the torsion spring 74 by a slidable cam bar 141 interposed between the cam plate 106 at the dwell face 114 thereof and a projecting tooth 142 on the post 72 (Fig. 6) which carries the transfer means.

The operation of the fixture 18, referring particularly to Figs. 1, 2, 11 and 12, assuming that the grinding wheel 16 and the motor 47 are being driven and the table 13 carrying the fixture has just been laterally moved by manipulating the hand wheel 15 to carry the fixture from the under wheel and that a ground tool 10 is still gripped by the chuck 53 and a train of blanks is in position abutting the inner end of the last ground blank is as follows:

The operator grasps the hand lever 95 and quickly rocks it upwardly and then back to its starting position (Fig. 1). During the upward movement of the hand lever 95 the sliding cam bar 100, cam plate 41 and plunger 54 are moved in a similar direction by means of the connections previously described. As the cam bar 100 thus moves, the cam face 117 rides against the dog 122, which results in the bell crank lever 123 being rocked clockwise against the action of the spring 128 and carrying the roller 127 against the upper flange of the chuck actuator sleeve 126 with sufficient pressure to move the same and open the chuck 53, thus releasing the ground tool 10. Due to this pressure on the sleeve 126, the chuck is momentarily stalled. In timed relation with the opening of the chuck 53, the dwell face 114 on the cam bar 100 moves upwardly away from the outer end of the spring pressed cam bar 141, which then moves to the right (Figs. 1 and 11) and onto the upwardly advancing cam face 109 and thence onto the dwell face 113. This movement of the cam bar 141, which engages at its inner end the tooth 142 on the post 72 carrying the tool transfer means 68 causes the latter means to move to the position shown in Figs. 6 and 8, through the action of the spring 74, and is now in operative position for transferring the released ground tool.

Thereafter, in the continued upward movement of the hand lever 95, the plunger 54 has been advanced sufficiently to transfer a blank 10 from the slot 35 of the magazine 11 and into abutting engagement with the rear blank in the train of blanks extending through the axis of the motor 47 and pushing the same forward ejects the leading ground blank from the open chuck onto the upper face of the plate 79 of the transfer means 68, as shown in dotted outline in Fig. 8. As the ground blank is ejected, the following blank is fed into the chuck and in timed relation therewith the pivotal transfer member 69 is slightly rocked clockwise due to the upwardly moving cam face 110 on the cam bar 100 moving into engagement with the cam bar 141 and thus the stop face 81 is positioned in the path of the advancing blank 10. Upon this positioning of the stop face 81 the cam bar 141 is engaging the dwell face 115 of the cam bar 100. This position of the stop face 81 relative to the blank when the latter engages the stop face is shown in Fig. 8. During the period when the ground tool is being ejected and the following blank positioned, as above described, the chuck 53 is held open due to the dog 122 riding on the left hand edge of the cam plate 107 on the cam bar 100. Immediately thereafter the dog 122 snaps into the notch 120 of the plate 107, as clearly shown in Fig. 12. This permits the bell crank lever 123 to rock counterclockwise due to the action of the spring 128 and carrying the roller 127 against the lower flange of the chuck actuator sleeve 126 with sufficient pressure to move the same and close the chuck 53 and thereby gripping the blank 10. The extent of this latter movement of the bell crank lever 123 is limited by the cam projection 135 on the lever stopping against the left hand vertical face of the cam plate 108 below the cam face 121. This pressure on the sleeve 126 momentarily stalls the chuck.

At this point in the operation, the hand lever 95 has reached the limit of its upward movement (Fig. 1), which is limited by the actuator block 62 of the blank feeding plunger 54 engaging the end wall 138 of the slot 65. Immediately thereafter the hand lever 95 is moved downwardly until it engages the stop pin 139. During this latter movement of the lever 95, the cam bar 100 is moved downwardly and the dog 122 is immediately idly rocked clockwise as it engages the upper end wall of the notch 120 and also the cam projection 135 on the bell crank lever 122 rides up the cam face 121 and onto the left hand vertical face of the cam plate 108 and this serves to rock the lever clockwise to the position shown in Figs. 1 and 11, wherein the roller 127 is positioned intermediate the flanges of the chuck actuator sleeve 126 and, consequently, no pressure is being exerted thereon to retard the rotation of the chuck.

In timed relation to the closing of the chuck 53 and its rotation to drive the blank 10, as just described, the cam face 109 engages the end of the cam bar 141 and slides it to the left (Fig. 1), thus rocking the pivotal transfer member 69 with the last ground and ejected tool 10 (Fig. 8) across the upper face of the receiving plate 79 and into the container 87. This completes a cycle of operation of the fixture 18, during an upward and downward movement of the hand lever 95, while positioned, as shown in Fig. 1, at the left of the rotating grinding wheel 16. To grind the rotating blank 10 the hand wheel 15 is rotated to reciprocate the table 13 carrying the fixture 18 to and fro under the grinding wheel 16. This returns the fixture to the position shown in Fig. 1, ready for the next operating cycle.

To prevent damage to the fixture 18 or the grinding wheel 16 by a manipulation of the hand lever 95 during the lateral movement of the table 13, a stop member 145 is attached to the frame of the grinder 14 (Figs. 1 and 2), the outer vertical end face of the stop member lying in the path of an enlarged head 146 on the pivot screw 96 for the hand lever and the actuator block 62.

In order to cool the blanks 10 during the grinding operation a blast of air is directed thereon from a nozzle 147 (Figs. 1 and 6) supplied from a suitable source.

To prevent the last blank 10 fed into the motor bushing 49 from creeping backwards into the stationary slot 35 of the magazine 11 where it would interfere with the supplying of blanks thereto in the operation of the blank transferring and aligning plate 28, a yieldable wire stop member 148 (Figs. 2 and 5) is attached to the magazine side plate 26 which lies adjacent the motor 47. The member 148 normally lies partially over the aperture 51 in the side plate 26 to prevent rearward movement of a blank from the bushing 49 and the arrangement is such that it is cammed laterally out of the way during the feeding of blanks into the motor bushing and then returns to its stop position.

Although a specific embodiment of the invention has been described hereinbefore, it will be understood that many modifications may be made in the described apparatus without departing from the invention.

What is claimed is:

1. An article handling apparatus comprising a rotatable chuck, a hollow spindle carrying said chuck, means for yieldably advancing an article through said spindle into the chuck, an article receiving device including a member movable into position to receive a finished article for transfer, said member having a portion effective in one position as a stop for a new article being inserted into the chuck, and means for moving said member first to receive the finished article and thereafter to position the stop portion for the new article.

2. An article handling apparatus comprising a rotatable chuck, a hollow spindle carrying said chuck, means for yieldably advancing an article through said spindle into the chuck, an article receiving device having a surface to receive a finished article, said device including an oscillatory member movable into position to receive the finished article for transfer from said surface, said member having a portion extending below said surface effective in one position as a stop for a new article being inserted into the chuck, and means for moving said member first to receive the finished article and thereafter to position the stop portion for the new article.

3. An article handling apparatus comprising a plurality of members forming a container for holding articles in horizontal parallel stacked relation, one of said members being movable and having a plurality of horizontal article receiving and transferring slots in its inner face alignable with an article receiving slot in an opposed face of one of said other members and upon being moved in one direction permitting one or more articles from said container to enter one or more of said slots, and means for moving an article from one of the slots of said movable member into said receiving slot during movement of said member.

4. An article handling apparatus comprising a plurality of members forming a container for holding articles in horizontal parallel stacked relation, one of said members being movable and having a plurality of horizontal article receiving and transferring slots in its inner face alignable with an article receiving slot in an opposed face of one of said other members, means for operating said movable member whereby one or more articles from said container will enter one or more of its said slots during movement of said member in one direction, and yieldable means for moving an article from one of the slots of said movable member into said receiving slot during movement of said member.

5. An article handling apparatus comprising a plurality of members forming a container for holding articles in horizontal parallel stacked relation, one of said members being vertically reciprocative upon said other members and having a plurality of article receiving and transferring slots in its inner face alignable with an article receiving slot in an opposed face of one of said other members and upon being moved upwardly permitting one or more articles from said container to enter one or more of said slots, means for yieldably retaining said member in a lowered position, and means for moving an article from one of the slots of said movable member into said receiving slot during movement of said member in either direction.

6. An article handling apparatus comprising a plurality of members forming a container for holding articles in horizontal parallel stacked relation, one of said members being vertically reciprocative upon slideways on said other members and having a plurality of horizontal article receiving and transferring slots in its inner face alignable with an article receiving slot in the opposed face of one of said other members, said latter slot being aligned with apertures in opposed side members of the container, means including a common actuator for operating said movable member whereby one or more articles from said container will enter one or more of its said slots during an upward movement of said member and an article carried in said receiving slot will be ejected therefrom, and means for moving an article from one of the slots of said movable member into said receiving slot during movement of said member in either direction.

JOHN S. STULL.